May 9, 1967 P. T. TROELL ET AL 3,318,723
METHOD OF FABRICATING A HEAT SHIELD STRUCTURE
Filed March 5, 1964
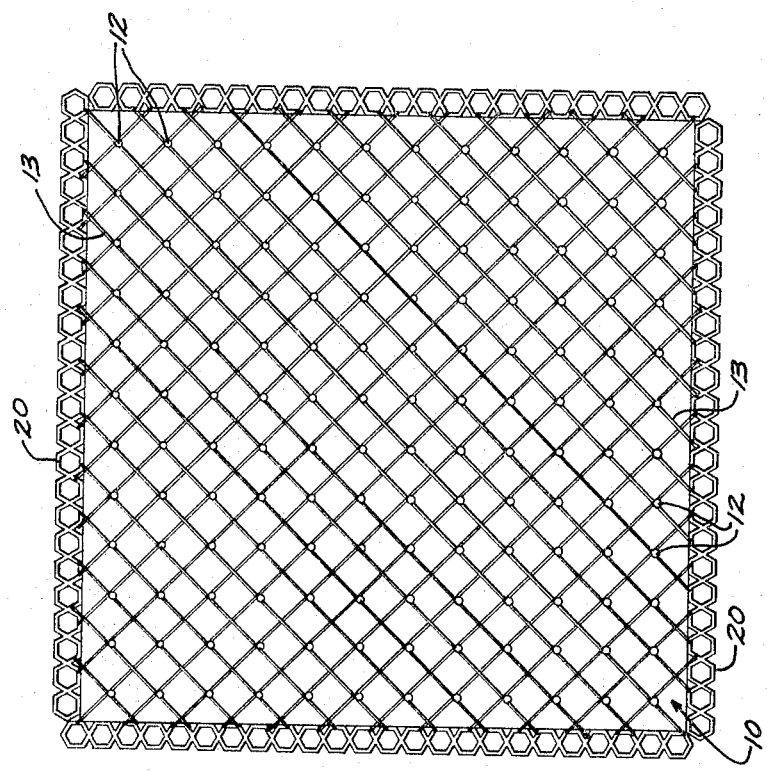
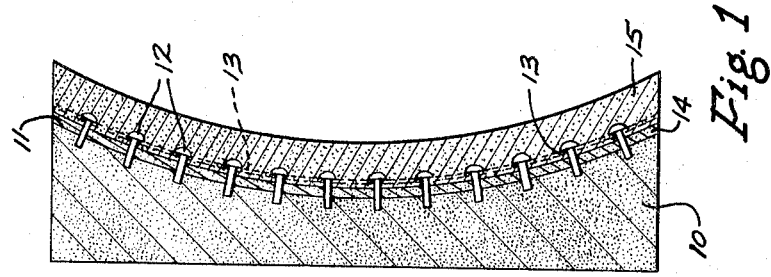
INVENTORS
PETER T. TROELL,
THOMAS W. SMOOT,
ALBERT L. RENKEY &
BY DONALD F. KING
William C. Nealon
ATTORNEY “United States Patent Office”
3,318,723
Patented May 9, 1967

3,318,723
METHOD OF FABRICATING A HEAT SHIELD STRUCTURE
Peter T. Troell, Pittsburgh, Thomas W. Smoot, Bethel Park, and Albert L. Renkey and Donald F. King, Pittsburgh, Pa., assignors to Harbison-Walker Refractories Company, Pittsburgh, Pa., a corporation of Pennsylvania
Filed Mar. 5, 1964, Ser. No. 349,593
2 Claims. (Cl. 117—70)

This invention relates to construction of heat-resistant structure. More particularly, it relates to construction of heat-resistant refractory shields characterized by nonplanar or upright (nonhorizontal) surfaces arranged for contact with high temperatures.

Contemporary science has expressed the need for a heat-resistant shield or shielding material which can be combined in an easily built structure at reasonable costs. For example, there is need for strong, heat-resistant shields against which the thrust of rocket engines or the like may be directed in static testing. Some workers have suggested plates or sheets of various metals and metal alloys, usually mounted over a concrete backup, as suitable for such purposes. Extensive metal plating is, of course, expensive, is relatively difficult to install because of the weight thereof, and is usually not as "refractory," i.e. able to withstand high temperatures, as one might desire.

It has been suggested that refractory metal oxides of the type used to fabricate metallurgical furnaces and the like might be a better solution. A new problem arises here, however, as to how and in what manner such refractory should be installed. We know of one attempt in which a heat shield was constructed, which consisted of an upright Portland cement concrete backup faced with calcium aluminate cement-bonded concrete (the former usually is not considered a "refractory" concrete, whereas the latter is). Upon set of the calcium aluminate concrete veneer, the edges peeled up from the Portland cement backup. There also were more central areas of separation of veener from backup. These latter areas could be detected by rapping soundly on the exposed veneer face. A hollow thud or echo could be aurally discerned; whereas, with good bond between backup and veneer, a solid ring-like sound results.

Accordingly, it is an object of the present invention to provide for construction of heat shields structurally characterized by multiple laminations of different materials well bonded to each other. It is another object of the invention to provide improved heat shield structure.

Briefly, according to one aspect of the invention, a heat shield backup is constructed using a conventional Portland cement and aggregate concrete. When set, the surface subsequently to be veneered is roughened, as by sand blasting, or causing area spalls to develop by localized application of heat. The heat may be, for example, applied with an oxyacetylene torch, radiant heating devices, etc. The roughened surface is then provided with novel reinforcing structure for subsequently applied veneer. This support structure is, preferably, comprised of a hex metal grid about all exposed edges or limits of the face to be veneered. We suggest from 2 to 4″ wide hex steel stripping of about ⅛ to about 2½″ in thickness or depth. A plurality of anchor bolts is disposed over the surface to be veneered, and firmly seated in the backup. They should be no longer than one-half inch less than the thickness of the refractory veneer. A very satisfactory arrangement of bolts would be, for example, ¾″ diameter bolts on 6′ centers, ½″ bolts on 4′ centers and ¼″ bolts on 2′ centers. A foraminous member is then rigidly secured to the exposed end portions of the bolts. A preferred foraminous sheet would be metal screening similar to that commonly used in fencing, but of somewhat heavier gauge wire sufficient to withstand, when combined with the other supporting devices, stresses as governed by the weight of the refractory veneer. After installation of the foregoing metal reinforcing elements, a slurry is prepared consisting essentially of 30 to 70%, by weight, water and 70 to 30%, by weight, solids. The solids consist essentially of calcium aluminate cement substantially all the particles of which pass a 65 mesh screen, with the preponderance (60 to 90%, by weight) of such −65 mesh material also passing a 200 mesh screen. This fine slurry is gunned or, more accurately, pneumatically applied as a wash over the exposed face of the backup on which the reinforcing elements previously have been positioned. The wash should be applied in a thickness varying from about ¹⁄₁₆ to ½″ but, preferably, in the range ⅛ to ¼″. As soon as the wash begins to stiffen, a second lamination is applied. (When we say that the wash has just begun to stiffen, we mean to describe that condition which is visually evident when a uniform sheen is replaced by dry matte-appearing areas.) The second lamination is also, preferably, pneumatically emplaced. It is comprised of a mixture of refractory aggregate, preferably, of the alumina-silicate type (this group includes calcined and tubular alumina, bauxites, diaspores, calcined flint clay or the like, and members of the kyanite and sillimanite groups), with a calcium aluminate cement binder therefor. This group is generally prefered for economic reasons, although other, more expensive materials, such as zircon, zirconia, etc., can be used. The calcium aluminate cement is substantially all −65 mesh, with the preponderant portion (60 to 90%, by weight) thereof passing a 200 mesh screen. The aggregate is substantially all −10+65 mesh, although up to 10 or even 15% can be as coarse as ¼″, and 20 or 30% can be −65+150 mesh. The cement can range between 10 and 40%, by weight, of the total mix of aggregate and cement, but we prefer a 70% aggregate and 30% cement composition. This mixture is tempered with about 20 parts, by weight, of an aqueous tempering fluid. The tempering fluid can range between about 10 and about 30%, by weight, although we believe a 30% water content makes the mix a little more fluid than is usually desirable.

The tempered aggregate and cement mix is gunned over the previously deposited and just setting wash layer to a depth of about 2″. This second layer thickness is, of course, variable; but, for optimum results, should be to such a depth as to at least cover all portions of reinforcing elements by about ½″.

As soon as the second lamina or layer has been emplaced, the unit is cured. This curing can be accomplished, for example, in either of two manners. We prefer to form a water-impervious sheet or film over all exposed surfaces of the calcium aluminate-containing material for at least about 24 hours. This water-impervious sheet may, itself, be applied by spraying, for example, with a plastic or silicone spray which sets to form a water impervious film, in situ. Alternatively, the cure can be accomplished by covering the calcium aluminate-containing material with a sheet of flexible plastic film. A third, but less satisfactory, method of assuring a controlled cure to allow adequate development of strength in the calcium aluminate cement is to constantly wet down or spray exposed surfaces with water. The difficulty with this latter method is the tendency to form rivulets or streams which wash away the concrete. Ideally, only sufficient water is applied as to maintain a slick sheen-like appearance over exposed surfaces without run-off, and without localized matte or dry-appearing areas.

Other details and further features and advantages of heat shield construction according to this invention will become readily apparent from the following detailed description, with reference to the drawings. In these drawings:

FIG. 1 is a schematic side elevational view of a heat shield constructed according to this invention. Dimensions of parts have been exaggerated, for purposes of clearer description.

FIG. 2 is a front view of the backup structure of FIG. 1, with reinforcing elements mounted thereon, and as it appears prior to application of subsequent lamina.

In FIG. 1, there is shown an upright backup structure 10. Its forward face 11 is generally concave when viewed from the side. A suitable Portland cement aggregate mixture for fabrication of the backup would be, for example, as follows: Depending on structural requirements, a mixture of coarse aggregate, such as siliceous gravels, limestone, granites, etc., minus 1″ to fines (40 to 60% +65 mesh), fine siliceous sand (90% −4 mesh +325 mesh), and Portland cement. (Commercially available material is practically all −325 mesh.)

A plurality of bolts 12 is shown extending outwardly from the surface 11, with a foraminous screen 13 attached to and over their forward ends. A first wash layer or lamina 14 is evenly applied over the forward face 11 of backup 10 to a depth of about ⅛ to ¼″. A second layer 15 is applied over the first layer 14 to a depth of about 2″ but, in any event, deep or thick enough so that exposed ends of the bolts 12 are covered by at least about ½″ of said latter layer. The result is a substantially monolithic structure comprised of three lamina or sections including a backup, a bonding wash coat 14, and an exposed working surface or layer 15. The bonding layer 14 serves to assure good joinder between the backup 10 and the forward face 15.

In FIG. 2, a better view of the multi-component reinforcing structure is shown. It can be seen that all exposed edges of the forward face 11 of the backup 10 have a strip of hex grid 20 secured thereto. A regular pattern of bolts 12 is spaced at substantially regular intervals over the face 11 with one end securely fixed within the body of backup 10, and the forward end extending outwardly a distance equal to at least the thickness of the hex grid 20. A chicken wire-like foraminous screen structure is secured about the bolts and the hex grid.

Suitable calcium aluminate cement for the practice of this invention can be almost any of the commercially available ones sold in commerce. The analysis of one such cement is set forth herein for purposes of completeness of disclosure, and to provide the details of the best embodiment known to us. It is as follows:

*Calcium aluminate cement*

|  | Percent |
|---|---|
| Silica (SiO$_2$) | 9.8 |
| Alumina (Al$_2$O$_3$) | 42.0 |
| Iron oxide (Fe$_2$O$_3$) | 5.0 |
| Iron (FeO) | 4.5 |
| Lime (CaO) | 37.6 |
| Magnesia (MgO) | 1.1 |
| Sulfate (SO$_3$) | 0.16 |
|  | 100.16 |

Again, strictly for purposes of complete disclosure, a suitable Portland cement oxide analysis is as follows:

|  | Percent |
|---|---|
| Silica (SiO$_2$) | 20.4 |
| Alumina (Al$_2$O$_3$) | 5.9 |
| Iron oxide (Fe$_2$O$_3$) | 3.1 |
| Lime (CaO) | 64.3 |
| Magnesia (MgO) | 2.0 |
| Sulfate (SO$_3$) | 2.3 |
| Loss on ignition | 1.2 |
|  | 99.2 |

A suitable aggregate for mixing with the Portland cement can be quartzite or silica rock of about 90 to 99% SiO$_2$ content. A satisfactory and preferred aggregate for mixing with the calcium aluminate cement, to make the outer layer 15 of a heat shield according to this invention, is as follows:

|  | Dry, percent | Calcined, percent |
|---|---|---|
| Silica (SiO$_2$) | 42.0 | 48.4 |
| Alumina (Al$_2$O$_3$) | 40.6 | 46.8 |
| Titania (TiO$_2$) | 2.1 | 2.4 |
| Iron Oxide (Fe$_2$O$_3$) | 1.0 | 1.1 |
| Lime (CaO) | 0.2 | 0.2 |
| Magnesia (MgO) | 0.3 | 0.4 |
| Alkalies | 0.6 | 0.7 |
| Loss on Ignition | 13.2 |  |
| Total | 100.0 | 100.0 |

Having thus described the invention in detail and with sufficient particularity as to enable those skilled in the art to practice it, what is desired to have protected by Letters Patent is set forth in the following claims.

We claim:

1. That method of fabricating a heat shield structure comprising the steps of, fabricating a Portland cement concrete mixture and forming a body therefrom, allowing said Portland cement concrete body to set and then roughening a surface thereof, attaching a reinforcing network over said roughened surface, fabricating a thin slurry of calcium aluminate cement and an aqueous tempering agent and pneumatically emplacing said slurry over said roughened surface, fabricating a calcium aluminate cement concrete mixture and pneumatically emplacing it over said previously deposited calcium aluminate cement after said cement has stiffened, installing a liquid impervious film over all exposed surfaces of said calcium aluminate cement concrete, maintaining said film over said calcium aluminate cement concrete for a time sufficient to allow set of the calcium aluminate cement and calcium aluminate cement concrete layers beneath it.

2. The method of claim 1 in which said film is in place for at least about 24 hours.

References Cited by the Examiner

UNITED STATES PATENTS

| 218,584 | 8/1879 | Smith. |  |
| 2,326,010 | 8/1943 | Crom | 264—256 X |
| 2,469,081 | 5/1949 | Ruedi | 264—333 X |
| 2,579,050 | 12/1951 | Ramsey. |  |
| 3,011,908 | 12/1961 | Carlson | 117—70 |

ALFRED L. LEAVITT, *Primary Examiner.*

J. R. BATTEN, JR., *Assistant Examiner.*